(No Model.)
R. P. GERLACH & F. STAHL.
SAW TOOTH.
No. 303,997. Patented Aug. 26, 1884.
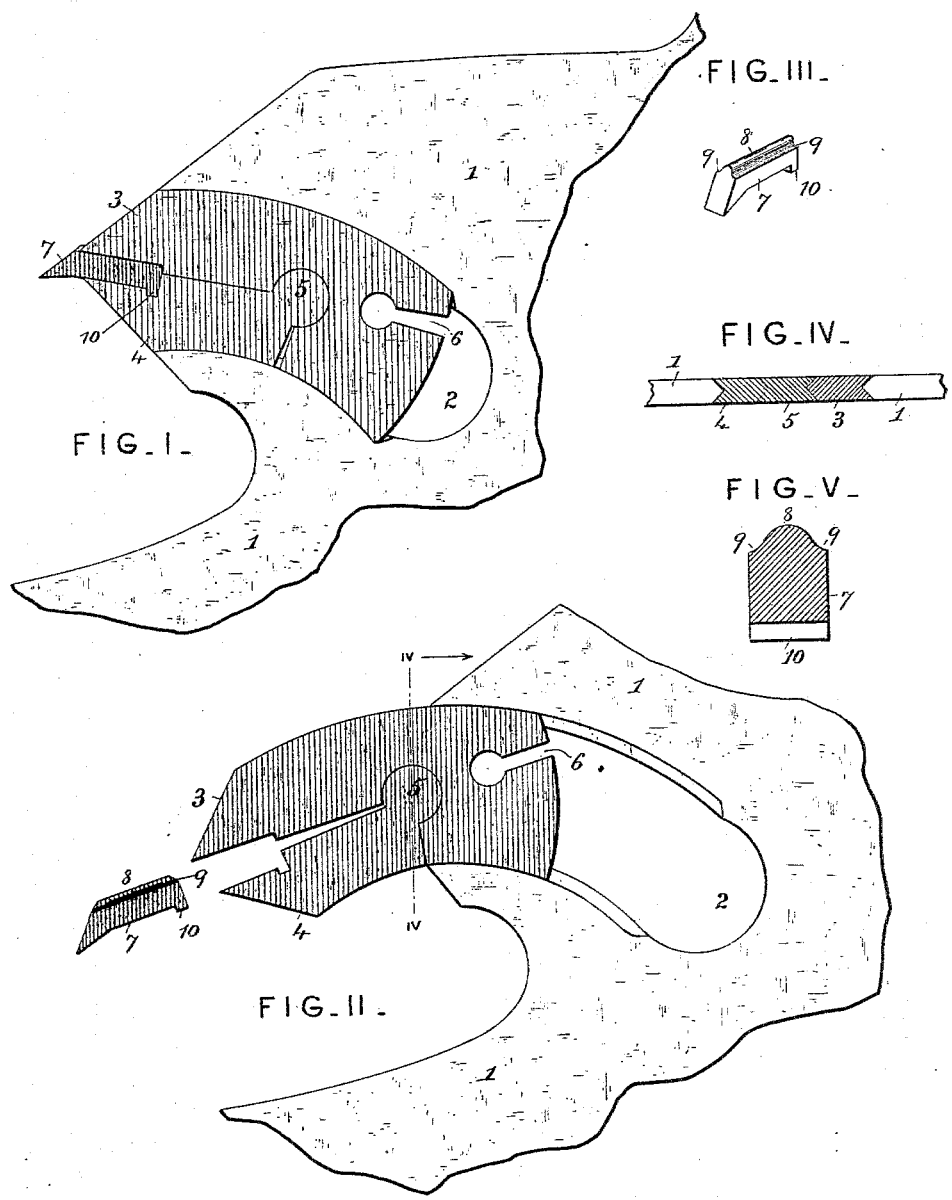
ATTEST.
Geo. P. Smallwood.
J. Henry Kaiser.
INVENTORS
Rudolph P. Gerlach.
Frank Stahl.
By Knight Bros
attys.

UNITED STATES PATENT OFFICE.

RUDOLPH P. GERLACH AND FRANK STAHL, OF CLEVELAND, OHIO.

SAW-TOOTH.

SPECIFICATION forming part of Letters Patent No. 303,997, dated August 26, 1884.

Application filed May 8, 1884. (No model.)

*To all whom it may concern:*

Be it known that we, RUDOLPH P. GERLACH and FRANK STAHL, citizens of the United States, residing at Cleveland, in the county of Cuyahoga and State of Ohio, have invented a certain new and useful Improvement in Circular Saws, of which the following is a specification.

The object of our invention is to provide an insertible-tooth saw in which nearly or quite as many teeth may be used as in a saw of like diameter in which the teeth are not removable; and, furthermore, to provide a mode of setting and securing the teeth, by which they will not be loosened under the strain and wear of sawing, and in which the adjacent parts of the plate will not be subjected to special violence, which, in many insertible-tooth saws now in use, causes rapid deterioration in the fastenings by which the teeth are held. We have devised and employ a holder consisting of two jaws hinged together by a joint which is made integral with the two parts of the holder, thus dispensing with the use of a separate rivet, the said holder sliding within a curved slot or seat in the saw-plate at such an angle that the strain of sawing will tend to press the holder more firmly into its seat and not to loosen the tooth.

The invention further relates to details in the construction of the hinged holder and in the form of the bit or removable tooth itself.

In the accompanying drawings, Figure I is a face view of a portion of a circular saw illustrating our invention, showing the tooth and its holder in position for sawing. Fig. II is a face view of the same, showing the holder drawn out and with its jaws open and the tooth detached. Fig. III is a perspective view of the tooth or bit. Fig. IV is a transverse section of the holder on the line IV IV, Fig. II. Fig. V is an enlarged transverse section of the detached tooth or bit.

1 represents a portion of the saw-plate, and 2 one of the curved slots which are cut therein to form seats for the tooth-holders, and in such direction as to cause the said tooth-holders to be forced into their seats by the pressure or strain in sawing, so that no tendency will exist to loosen the tooth. The jaws 3 4 of the tooth-holder are hinged together at 5 by forming a circular boss or projection on the heel of the jaw 4, and fitting it in a countersunk socket prepared to receive it in the jaw 3, the lug 5 being then riveted or upset so as to fill the countersunk socket. A space between the heel of the jaw 4 and the base of the jaw 3 permits the separation of their ends to a sufficient extent, while they cannot be completely detached one from the other. This form of joint, it will be observed, obviates the necessity of any separate rivet, and causes no projection beyond the smooth surface of the saw on either side. The slot 2 is enlarged slightly at bottom, and the holder is provided with an open spring-slot, 6, at its heel to cause it to expand within the slot 2, as a further protection against the disengagement of the tooth. The seat or slot 2 is formed with two concentric faces by means of a suitable milling-tool, the edges of the slot or seat and of the holder 3 4, which fits therein, being tongued and grooved in customary manner to permit the holder to slide in and out and secure it against lateral displacement.

The detachable tooth or bit 7 is constructed with a flat or square front face, and with a back having a longitudinal tongue, 8, either square or round, flanked by two oblique shoulders, 9, as shown in Fig. V, the longitudinal tongue serving to secure the tooth firmly against lateral displacement, while the shoulders secure it against rotation in its seat in the clamp or holder. The heel of the tooth or bit is furthermore provided with a lug, 10, projecting forward and engaging in a corresponding recess in the jaw 4 of the holder, to secure the tooth against escaping endwise or flying out. The mode of inserting the tooth or bit will be clearly understood by reference to Fig. II. When the holder 3 4 is partially withdrawn to bring its joint to the extremity of the slot or seat, the jaw 4 may be drawn away from the jaw 3, as represented, to the extent permitted by the space (seen in Fig. I) between the heel of the jaw 4 and the base of the jaw 3. When the jaws are thus separated, as shown in Fig. II, the tooth or bit 7 is inserted in its place, and in the act of forcing the hinged holder back into its seat 2 its jaws 3 4 are tightly clamped upon the tooth or bit 7, so as to hold it immovably in position. The teeth may thus be removed and replaced with great facility without taking the holder completely out of the plate, and when the tooth is in position it is clamped, as in a vise, throughout its entire length, excepting only the working-point, the slot in the solid saw-plate itself serving as an efficient clamp without the addition of keys or other detachable parts.

In most of the common forms of detachable-tooth saws now in use severe strain and violence are sustained by the projecting point of the solid saw-plate immediately at the back of the tooth or bit. The result, especially in mills in which high power and heavy feed are employed, is that the projecting points of the saw-plate become strained or battered, so as to impair the security of the tooth and cause it to be clamped or held only at or near its heel. By our invention we effectually obviate this difficulty in two ways—first, by equalizing and distributing the strain through the length of the tooth-holder, and, second, by providing detachable holders to bear the strain on the back of the teeth or bits and protect the saw-plate itself from any direct pressure or violence therefrom.

It will furthermore be seen that while our detachable saw-teeth are inserted and secured as nearly as practicable in the line of strain, they require little or no more room than is necessarily occupied by solid teeth. Hence we are enabled to provide a saw of given diameter with as many teeth as when the teeth are solid, or in one piece with the plate, instead of from half to three-fourths as many teeth, as is the case with many forms of detachable-tooth saws now in common use. It will further be seen that the mode of applying and securing the teeth provides as free and effective clearance for sawdust as in solid-tooth saws.

Having thus described our invention, the following is what we claim as new therein and desire to secure by Letters Patent:

1. The combination of the slotted solid saw-plate, a bit-holder constructed with two jaws connected by a hinge, and a steel bit or tooth held by said bit-holder through the medium of a tongue-and-groove joint, substantially as set forth.

2. The combination, with the solid saw-plate having slots or seats curved, as shown, and having the represented obliquity to the radius of the plate, of corresponding double-jawed bit-holders, and bits fitted therein, substantially as and for the purpose set forth.

3. The combination of the slotted solid saw-plate with a bit-holder consisting of a rigid jaw, and a movable jaw hinged thereto at a suitable distance from the butt-end thereof, (whereby said jaws may be opened without completely removing the holder from its slot,) and a bit, substantially as set forth.

4. A saw-plate having curved slots of equal width some distance inward from the periphery and expanding slightly at the base, in combination with a bit-holder fitting the parallel portion of the slot, and having expanding spring-slot in its base to hold it in its seat, as explained.

5. A saw-bit formed with a tongue at back to confine it against lateral displacement, and a lug at its base, in combination with a double-jaw bit-holder and a saw-plate, as set forth.

6. A saw-bit formed with a tongue at back to keep it from lateral displacement, shoulders on each side of said tongue to keep the bit from turning, and a lug at the base to keep it from flying out, in combination with a slotted saw-plate, and a bit-holder forming a seat for the said bit, as set forth.

7. The combination of a saw-plate having oblique curved slots in its periphery, hinged bit-holders fitting therein, and saw-bits clamped by said holders, all substantially as herein shown and described.

RUDOLPH P. GERLACH.
FRANK STAHL.

Witnesses:
J. W. WEBSTER,
M. C. HORTON.